US005807530A

United States Patent [19]
Anderson

[11] Patent Number: 5,807,530
[45] Date of Patent: *Sep. 15, 1998

[54] PROCESS FOR BURNING OF SULFUR

[75] Inventor: Lawrence Ernest Anderson, Gormley, Canada

[73] Assignee: Conamara Technologies Inc., Richmond Hill, Canada

[*] Notice: This patent issued on a continued prosecution application filed under 37 CFR 1.53(d), and is subject to the twenty year patent term provisions of 35 U.S.C. 154(a)(2).

[21] Appl. No.: 905,317

[22] Filed: Aug. 4, 1997

Related U.S. Application Data

[63] Continuation of Ser. No. 247,185, May 20, 1994.

[51] Int. Cl.$^6$ ............................ C01B 17/54; C01B 17/84
[52] U.S. Cl. ............................................ 423/543; 422/160
[58] Field of Search ................................. 423/522, 533; 422/160

[56] References Cited

U.S. PATENT DOCUMENTS

| | | | |
|---|---|---|---|
| 1,917,693 | 7/1933 | Bencowitz | 423/543 |
| 2,031,403 | 2/1936 | Bencowitz | 423/543 |
| 3,172,735 | 3/1965 | Barclay et al. | 423/543 |
| 3,879,530 | 4/1975 | Perret | 422/160 |
| 3,936,275 | 2/1976 | Perret et al. | 423/543 |
| 4,728,036 | 3/1988 | Bennett et al. | 239/132.3 |

FOREIGN PATENT DOCUMENTS

| | | | |
|---|---|---|---|
| 762374 | 7/1967 | Canada | 423/543 |
| 1386143 | 3/1981 | France | 423/543 |
| 2395974 | 3/1993 | France . | |
| 1769907 | 2/1988 | U.S.S.R. | 423/543 |
| 858939 | 1/1962 | United Kingdom . | |
| 1341861 | 12/1973 | United Kingdom . | |

OTHER PUBLICATIONS

Conroy et al, Combustion of Sulfur in a Venturi Spray Burner, Industrial & Engineering Chemistry vol. 41 #12 Dec. 1949.
"Sulphur Handling, Sulphur Combustion, Sulphuric Acid" Brochure, Lurgi, 1991.
"Studies on Atomizing Liquid Sulfur Using Atomizers of Different Construction", Banczyk et al, International Chemical Engineering, Jan. 1976, pp. 74–78.
"Moderisation of the Installation for Combustion of Liquid Sulfur in Sulfur Acid Plants" Chwalibog et al, Inz. Apar. Chem, 1974, 13(5), pp. 5–10 (Translation only).
"Utilization of Studies on Gas Turbulence for Construction of New Furnaces for the Combustion of Liquid Sulfur". Banczyk et al, Inz. Apar. Chem., 1974, 13(5), pp. 11–14 (Translation only).

*Primary Examiner*—Gary P. Straub
*Attorney, Agent, or Firm*—Ridout & Maybee

[57] ABSTRACT

In the manufacture of sulfuric acid, elemental sulfur is reacted to by finely atomizing liquid sulfur into a vortex of combustion air and returning the atomized sulfur in the vortex during combustion, the ratio of air and sulfur supplied to the vortex being substantially stoichiometric. This ensures that liquid sulfur is not deposited on the walls of a reaction chamber or the structure of a waste heat boiler receiving gases from the combustion chamber, and minimizes generation of nitrogen oxides.

5 Claims, 3 Drawing Sheets

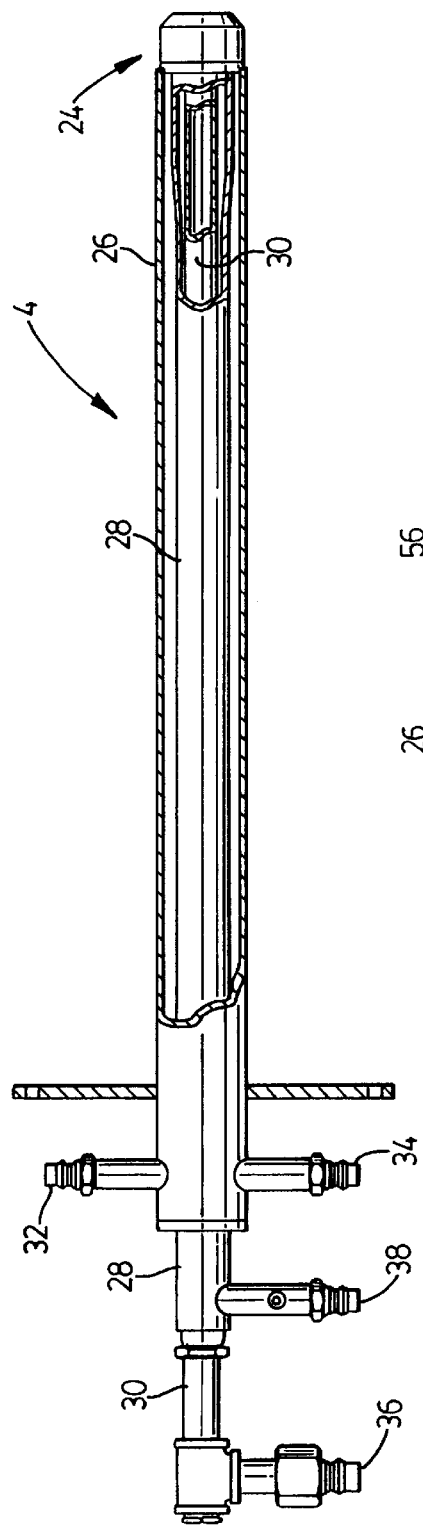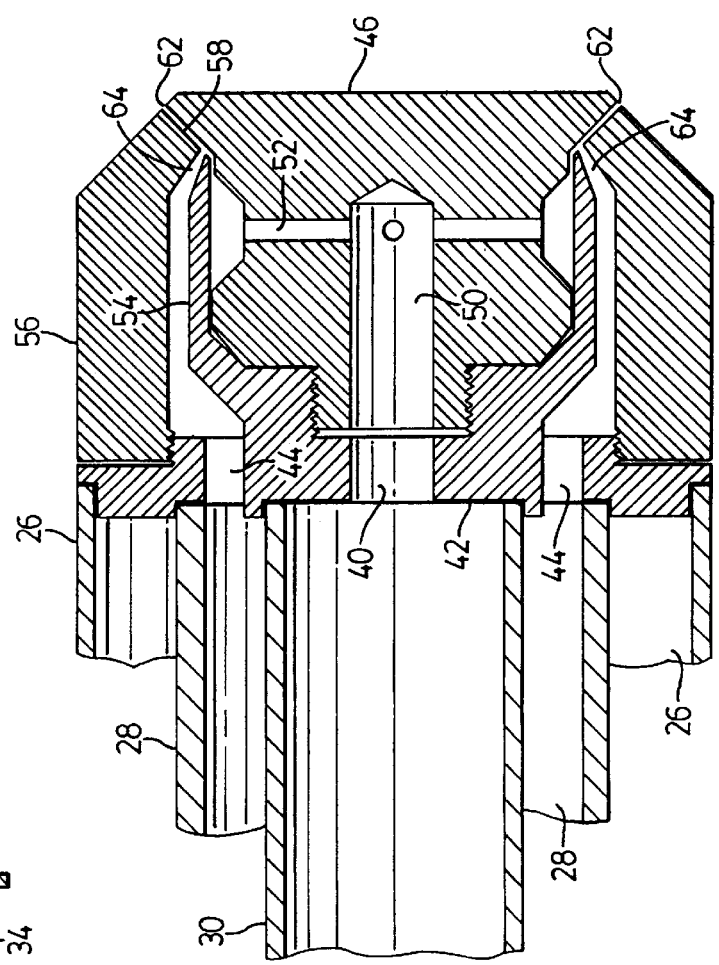

PROCESS FOR BURNING OF SULFUR

This application is a continuation of application Ser. No. 08/247,185, filed May 20, 1994.

BACKGROUND OF THE INVENTION

1. Field of the Invention

This invention relates to the burning of elemental sulfur in air to form sulfur dioxide as a stage in the production of sulfuric acid and other sulfur oxide acids (referred to hereinafter for convenience merely as sulfuric acid).

2. Review of the Art

The conventional process for manufacturing sulfuric acid comprises burning elemental sulfur in air to produce sulfur dioxide, catalytically oxygenating the sulfur dioxide to produce sulfur trioxide, and absorbing the sulfur trioxide in water to form sulfuric acid. The present invention is concerned solely with the initial stage of burning elemental sulfur.

The state of the art in conventional sulfur combustion techniques is described at pages 6 to 17 of a brochure "Sulphur Handling, Sulphur Combustion, Sulphuric Acid" describing inter alia the technology offered by Lurgi for the burning of liquid sulfur. The sulfur is liquified, and supplied at a fairly closely controlled temperature in the range of about 130°–145° C. to a rotary atomizer of a form illustrated in the brochure. The sulfur may either be burned with some excess of air, or alternatively, as indicated in the brochure, with less than a stoichiometric amount of air, prior to the gases being passed through a waste heat boiler. If less than a stoichiometric amount of air has been utilized, an after burner will be provided following the waste heat boiler in order to complete the combustion process.

Regardless of whether an excess or a deficit of air is utilized, the combustion process prior to the waste heat boiler tends in practice to be incomplete, with the result that liquid sulfur is deposited on the waste heat boiler structure and the base of the combustion chamber, where it burns with detrimental effects particularly upon boiler structures. As will be appreciated, the amount of liquid sulfur passed through a burner in such a plant may be very large, for example 60 gallons per minute, and in practice atomization of the sulfur typically can result in an average particle size in excess of 500 microns. This of course implies the presence of considerably larger particles within the combustion chamber volume, and in these circumstances, it is impossible to ensure sufficient rapid vaporization of the liquid sulfur particles to ensure complete combustion; some deposition of unburned sulfur outside the intended combustion zone is inevitable.

A further consideration in sulfur burning is to prevent production of nitrogen oxides due to reaction of nitrogen and oxygen in the combustion air. The presence of such oxides can discolour the resulting sulfuric acid, and render it unsuitable for applications outside the fertilizer industry. The presence of excess air in the combustion chamber, combined with high combustion temperatures, tends to promote the formation of nitrogen oxides; thus it may be advantageous as proposed in the brochure to utilize somewhat less air than is required to produce complete combustion in the combustion chamber, since theoretically nitrogen oxides will not be formed when less than a stoichiometric amount of air is present. Combustion can then be completed at lower temperatures downstream of the boiler. In practice, such an approach is not wholly effective when the admixture of the air and sulfur fails to provide completely uniform combustion conditions, while the incomplete combustion of the sulfur tends to aggravate the problem of damage to the plant resulting from the deposition of unburned sulfur and its subsequent combustion on surfaces of the plant structure.

Studies of the combustion of sulfur were carried out in Poland some twenty years ago: reference may be made to "Studies On Atomizing Liquid Sulfur Using Atomizers Of Different Construction", Banczyk and Jarzynowski, International Chemical Engineering, January 1976, pages 74–78; "Modernization Of The Installation For The Combustion Of Liquid Sulfur In Sulfuric Acid Plants", Chwalibog & Plaskura, Inz. Apar, Chem. 1974, 13(5), pages 5–10; and "Utilization Of The Studies On Gas Turbulence For The Construction Of New Furnaces For The Combustion Of Liquid Sulfur", Banczyk & Jurzynowski, Inz. Apar. Chem., 1974, 13(5), pages 11–14.

SUMMARY OF THE INVENTION

It is an object of the present invention to address the above problems, which are of very long standing, and to provide for more satisfactory and complete combustion of liquid sulfur when burning sulfur in a sulfuric acid plant.

In order to overcome the problems discussed above, I atomize the sulfur through a nozzle providing atomization to an average particle size of the order of 10 microns, into a vortex formed in a combustor by a substantially stoichiometric quantity of combustion air, the vortex being directed towards a reaction chamber. To ensure complete combustion and compensate for any marginally imperfect proportioning of air and sulfur, a very slight excess of air may be present, but this should be as small as possible so as to reduce nitrogen oxide formation to a minimum. The very fine atomization of the sulfur combined with the discharge of the atomized sulfur into an air vortex ensures extended retention of the sulfur in the combustor and very complete vaporization and combustion of the sulfur in the combustor or its immediate vicinity. Such complete combustion in a restricted zone eliminates the undesired deposition of unburned sulfur, and the exposure of the combustion chamber structure to flame temperatures, thus prolonging the life both of the waste heat boiler utilized to cool the gases, and of the reaction chamber itself.

SHORT DESCRIPTION OF THE DRAWINGS

In the drawings:

FIG. 3 is a longitudinal elevation of a burner gun as utilized in the burner, partially broken away to show internal structure; and FIG. 4 is a section through a nozzle of the burner gun, on an enlarged scale.

DESCRIPTION OF THE PREFERRED EMBODIMENT

Figure 1:
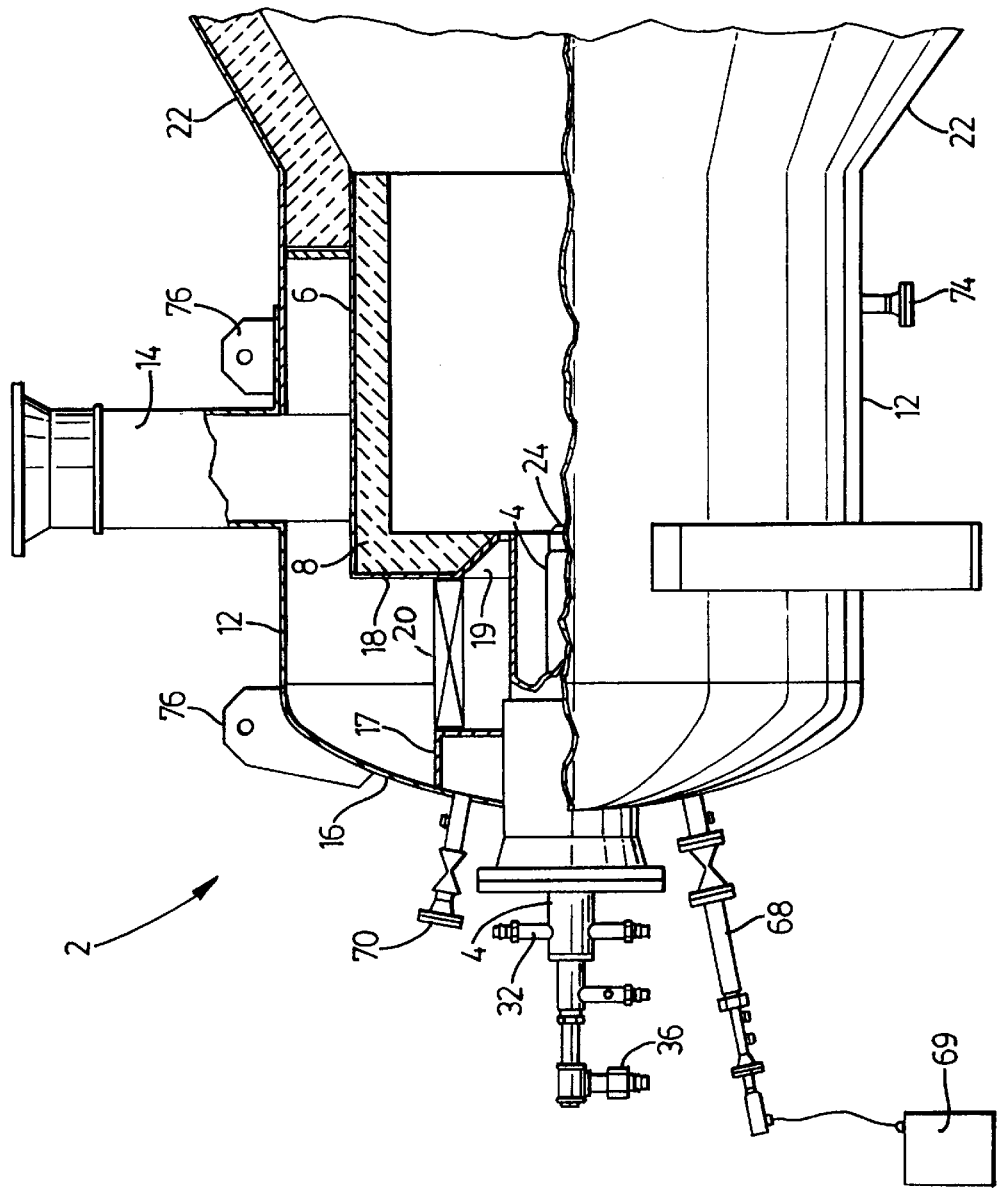
FIG. 1 is an isometric partially broken away view of a burner utilized in implementing the invention in a plant as shown in FIG. 1.

FIG. 1 shows diagrammatically a burner 2 attached to the combustion or reaction chamber 22 of a sulfur burning plant. The burner 2, through which enter liquid sulfur and air, is located at one end of the generally cylindrical refractory lined reaction chamber 22 from the opposite end of which hot gases exit through a water tube waste heat boiler for further processing. These gases essentially consist of sulfur dioxide and nitrogen. To give an idea of dimensions, a plant with the capacity for burning 750 tons of sulfur per day (yielding about 2200 tons per day of sulfuric acid) might have a reaction chamber 18 feet in diameter and 32 feet long, a burner 2 some 10 feet in diameter with a combustor 6 about 90 inches in external diameter and an atomizing gun some 6 inches in diameter, apart from its mounting flange.

The burner 2 is a development of the burner described in British Patent Specification No. 1,341,861, which was originally developed for the high rate combustion of hydrocarbon fuels, and is marketed by Conamara Limited under the trade mark AECOMETRIC. The atomizing gun 4, which is utilized and illustrated in more detail in FIGS. 3 and 4, is a development of the design disclosed in U.S. Pat. No. 4,728,036 (Bennett et al.). Although this patent discloses a nozzle assembly designed for the handling of coal slurries, it has been found that it is capable of providing very fine atomization in burners handling very large quantities of liquid fuel. A difficulty which tends to arise in high volume atomizers is that the very high velocities attained at the nozzle give rise to sonic effects which reduce throughput and interfere with the atomization process. This gun has been found capable both of handling high rates of liquid flow and producing exceptionally fine atomization without its performance being compromised by sonic effects, and without requiring very high liquid pressures.

Figure 2:
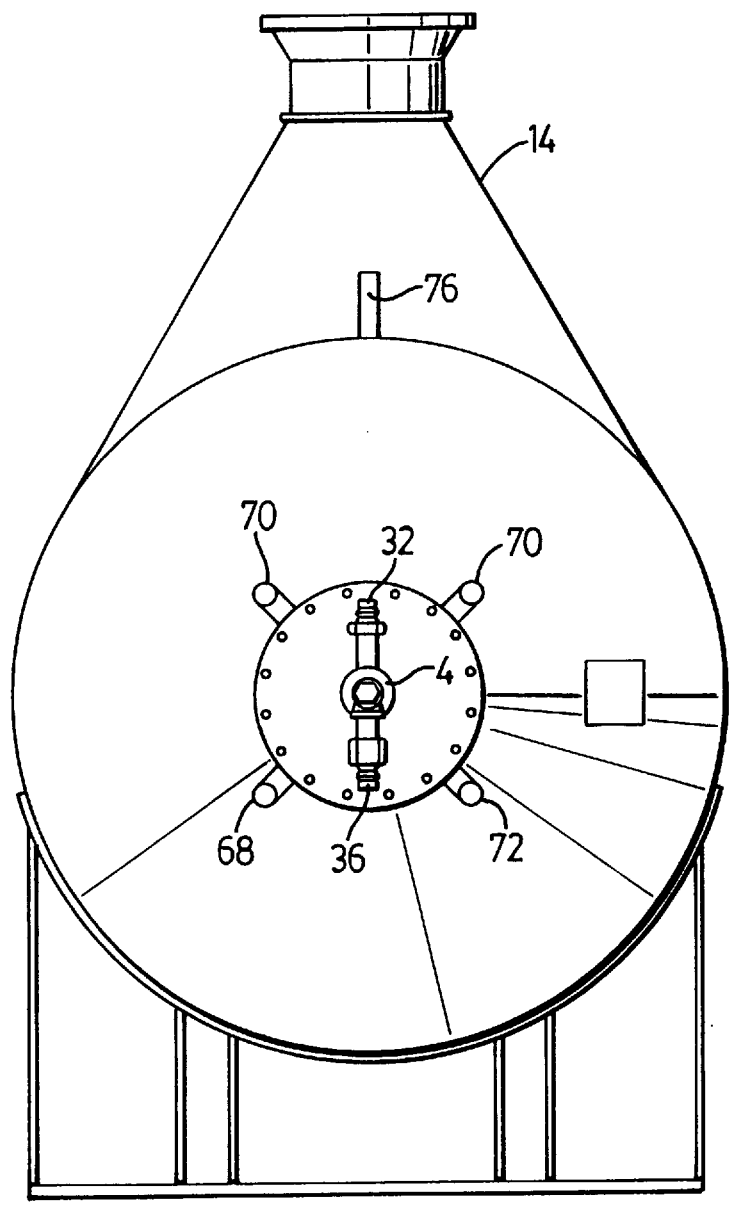
FIG. 2 is an end view of the burner.

The burner 2 shown in FIGS. 1 and 2 replaces a burner similar to that shown in the article discussed above in a sulfuric acid plant. The present burner consists of a combustor formed by a combustor housing 6 lined with refractory material 8 and concentrically mounted within a cylindrical windbox 12 surrounding and extending behind the combustor so that combustion air entering the windbox 12 through a duct 14 passes between a rear wall 16 closing the rear end of the windbox 12 and a structure 17 projecting from rear wall 16, and a plate 18 closing the rear end of the combustor housing 6, and through a concentric frustoconical opening 19 through the rear wall of the combustor housing 6 and the refractory material 8, thus causing air from the windbox to converge in a vortical flow on a nozzle 24 at the outer end of the gun 4. A vortical motion is imparted to this air by a ring of volute blades 20 extending between the structure 17 and plate 18. The presence of these blades results in the air passing through the gap and the frustoconical opening being accelerated into an intense vortex which entrains the atomized sulfur from the atomizer 4 and vaporizes and burns it during its retention in a vortical combustion zone within and extending forwardly of the combustor such that combustion will be essentially complete within a distance usually no more than one combustor diameter in front of the burner assembly. The structure producing the vortical air flow should be constructed so as to avoid resonance and standing wave effects in the air flow under normal operating conditions. The rate of flow of combustion air through the duct 14 is adjusted relative to the sulfur flow rate through the gun such as to provide enough oxygen to ensure substantially stoichiometric combustion of the sulfur, appropriate allowance being made for atomizing air utilized in the gun itself. This atomizing air will typically amount to about 2%–4% of the total air flow through the burner. In order to maintain optimum atomization, the temperature of the liquid sulfur supplied to the gun 4 is maintained in the range of about 130°–145° C., in which temperature range the viscosity of sulfur is similar or lower than that of a number 2 fuel oil; the viscosity of liquid sulfur rises extremely rapidly at temperatures approaching 160° C., and less rapidly at temperatures below 130° C. It is important therefore that the temperature of the sulfur does not rise to approaching 160° C. prior to atomization. Typically sulfur and atomizing air pressures of about 100 psig will provide atomization to an average particle size of 10 microns or less for a liquid of the viscosity of liquid sulfur in the above temperature range. For a plant of the capacity outlined above, the liquid sulfur flow might typically be 62660 pounds per hour at 100 psig and 140° C., in which case the air flow required for stoichiometric burning would be 58990 cubic feet per minute at 6 inches water pressure at the burner. About 156 lbs./minute of atomizing air at 100 psig would be required. Conveniently the atomizing air is preheated to the same temperature as the sulfur, and/or the sulfur and air passages of atomizer gun are jacketed with steam or other heated fluid so as to maintain the desired sulfur temperature through the gun.

For a detailed description of a gun of the type preferably utilized, reference may be made to U.S. Pat. No. 4,728,036. In brief, and referring to FIGS. 3 and 4, the gun comprises a cylindrical casing 26, within which are concentric tubes 28 and 30 for conveying air and sulfur respectively to the nozzle 24 which is secured to the casing 26 and tubes 28 and 30. A space between the casing 26 and the tube 28 is supplied with steam at about 140° C. through inlet and outlet connections 32 and 34. Liquid sulfur is supplied at 100 p.s.i. to the tube 30 through connection 36, and atomizing air at the same pressure trough connection 38 to the tube 28.

The sulfur passes through a central aperture 40 in a nozzle base 42, and the atomizing air through a ring of apertures 44 in the base. An atomizer cone member 46 is screwed into a threaded bore 48 in the base 42, and the sulfur passes from the aperture 40 through bores 50 and 52 in the cone member 46 to an annular chamber 53 defined between a cylindrical wall 54 projecting forwardly from the base and member and outside surface of the cone member. Air from the apertures 44 passes between the outside of cylindrical wall 54 and the inside surface of a cap 56 screwed onto an external thread on the base 42. The cap defines a frustoconical internal surface 58 spaced from a frustoconical external surface 60 of the cone member 46 to form a narrow annular divergent frustoconical passage 62. An outer end of the cylindrical wall 54 is also spaced from the cone member 46 to form a continuation of the passage 62, and from the cap 56 to form a tapering annular passage 64 which enters the passage 62 through an annular external opening and thus causes air to be directed in a convergent annular flow onto a layer of sulfur flowed over the surface of the cone member in the passage 62. The width of the passages can be adjusted by means of shims between the cone member and the base and the cap and the base. Typically the passage 62 has a width of about 0.050 inches, the passage 64 has a minimum width of about 0.040 inches, the entrance from the chamber 53 to the passage 62 has a width of about 0.015 inches, and the diameter of the annular opening from the passage 64 into the passage 62 is about 3.5 inches. The outer end of the nozzle 24 is chamfered at 66 so that the exit from the passage 62 is substantially perpendicular to the nozzle surface.

In order to start up the burner, an auxiliary removable or retractable gas fired burner gun 68 is provided (see FIGS. 1 and 2), equipped with an electrical igniter 69. The gun is used to warm up the reaction chamber prior to use and then to ignite the sulfur, and to reignite the sulfur in the event that combustion is extinguished for any reason. Conventional sight ports 70 and an instrumentation port 72 are also provided. A drain 74 is provided for any water condensing from combustion air admitted to the burner, and lifting eyes 76 facilitate removal and installation of the burner.

In use, the gun 68 is utilized to preheat the combustor and the reaction chamber, following which the flow of air through the duct 14 and of atomizing air and sulfur through the gun 4 is started. The burner has a good turn-down ratio, i.e. it can operate satisfactorily at much lower rates of delivery of combustion air and sulfur than its maximum rating, so it can be brought smoothly up to its rated capacity. The total air supplied is typically 100% to 102% of that required to provide the oxygen for stoichiometric reaction. The slight excess is primarily intended to allow for difficulties in maintaining precise flow rates, just sufficient to ensure that enough air is present to provide sufficient oxygen to wholly oxidize the sulfur to sulfur dioxide. The excess of air should be kept to a minimum so as to avoid generation of nitrogen oxides.

While the atomizing gun described is capable of providing average sulfur particle sizes of 10 microns or less, the actual average particle size is not believed particularly critical provided that the average particle is very much smaller than the average particle size of 500 microns which may occur in existing plants. Assuming the availability of suitable atomizing guns capable of handling the quantity of liquid sulfur required in such a plant, any average particle size within the same decimal order of magnitude, logarithmically centred on 10 microns, is believed to be suitable to enable combustion of the sulfur to be completed during retention in the vortex. The nozzle structure of the atomizing gun described is believed particularly advantageous because of its ability to provide very fine atomization of large quantities of liquid, whilst retention in the vortical combustion zone ensures an adequate opportunity for vaporization and combustion of the liquid sulfur particles before they can leave this zone.

I claim:

1. A method of burning sulfur in air to produce sulfur dioxide, comprising feeding liquid sulfur at a temperature of about 130° to about 145° to an atomizing gun to produce atomized sulfur, discharging the atomized sulfur into a vortex of air, vaporizing and combusting the atomized sulfur, and directing resulting combustion gases into a reaction chamber, air and sulfur being supplied to the vortex in a ratio corresponding substantially to that required to provide stoichiometric reaction of the sulfur and oxygen contained in the air to form sulfur dioxide, wherein:

a vortex of air is formed in a cylindrical combustor by discharging air from a wind box surrounding the combustor, through a ring of volute blades and into a passage converging onto a cylindrical axis of the combustor at one end thereof, the sulfur is atomized to an average particle size in the order of ten microns and discharged axially into said vortex through a divergent annular nozzle coaxial with said passage, the combustor opening at an axially opposite end thereof into the reaction chamber which is of much larger dimensions than the combustor; and the sulfur is vaporized and combusted in the air while retained in a vortical combustion zone within and extending forwardly of the combustor such that combustion is essentially complete within a distance no more than one combustor diameter beyond said other end of the combustor.

2. A method according to claim 1, wherein the air supplied to the vortex is 100%–102% of that require to provide said stoichiometric reaction.

3. A method according to claim 1, wherein a part of the air supplied to the vortex is utilized to atomize the liquid sulfur.

4. A method according to claim 3, wherein the liquid sulfur is atomized by being flowed in a divergent layer over a surface of a frustoconical body within a narrow annular divergent frustoconical passage in an atomizing nozzle, and impinged upon within the passage by a convergent annular flow of atomizing air.

5. A method according to claim 4, wherein a balance of the air supplied to the vortex is directed into a vortical flow converging upon the nozzle.

\* \* \* \* \*